US011035220B2

(12) United States Patent
Teague et al.

(10) Patent No.: US 11,035,220 B2
(45) Date of Patent: Jun. 15, 2021

(54) METHODS AND MEANS FOR CASING INTEGRITY EVALUATION USING BACKSCATTERED X-RAY RADIATION IN A WELLBORE ENVIRONMENT

(71) Applicants: Philip Teague, Houston, TX (US); Melissa Spannuth, Houston, TX (US)

(72) Inventors: Philip Teague, Houston, TX (US); Melissa Spannuth, Houston, TX (US)

(73) Assignee: Visuray Intech Ltd. (BVI), Tortola (VG)

( * ) Notice: Subject to any disclaimer, the term of this patent is extended or adjusted under 35 U.S.C. 154(b) by 0 days.

(21) Appl. No.: 16/165,579

(22) Filed: Oct. 19, 2018

(65) Prior Publication Data

US 2019/0085681 A1 Mar. 21, 2019

Related U.S. Application Data

(60) Provisional application No. 62/574,282, filed on Oct. 19, 2017.

(51) Int. Cl.
G01V 5/00 (2006.01)
E21B 47/002 (2012.01)
(Continued)

(52) U.S. Cl.
CPC .......... E21B 47/002 (2020.05); E21B 47/007 (2020.05); G01N 23/203 (2013.01);
(Continued)

(58) Field of Classification Search
CPC ............ E21B 47/0002; E21B 47/0006; G01N 23/203; G01N 2223/053;
(Continued)

(56) References Cited

U.S. PATENT DOCUMENTS

2004/0211903 A1* 10/2004 Bynum .............. G01N 21/4795
250/341.1
2006/0256917 A1* 11/2006 Jacobs ................ G01N 23/203
378/76
(Continued)

OTHER PUBLICATIONS

Notification of Transmittal of the International Search Report and the Written Opinion of the International Searching Authority, or the Declaration issued in the corresponding PCT International Application No. PCT/US2018/056731, dated Feb. 18, 2019 (15 pages).
(Continued)

Primary Examiner — Dani Fox
(74) Attorney, Agent, or Firm — Adams and Reese LLP; Raymond R. Ferrera

(57) ABSTRACT

An x-ray-based casing imaging tool, defined by a combination of source collimators, located cylindrically around an X-ray source and a rotatable two-dimensional per-pixel collimated imaging detector array, is provided, the tool including at least an x-ray source; a radiation shield to define the output form of produced x-rays; a direction controllable two-dimensional per-pixel collimated imaging detector array; an imaging window within the tool housing that reduces attenuation of x-rays passing through said tool housing; sonde-dependent electronics; and a plurality of tool logic electronics and PSUs. A method of using an x-ray-based casing imaging tool to determine the integrity of well casing or tubing is also provided, the method including at least: producing x-rays in a shaped output; measuring the intensity of backscatter x-rays returning from materials surrounding the wellbore; controlling two-dimensional per-pixel collimated imaging detector arrays; and converting image data from said detectors into consolidated images of the wellbore materials.

12 Claims, 2 Drawing Sheets

(51) Int. Cl.
    *G01N 23/203*     (2006.01)
    *G01V 5/12*     (2006.01)
    *E21B 47/007*     (2012.01)

(52) U.S. Cl.
    CPC .......... *G01V 5/12* (2013.01); *G01N 2223/053* (2013.01); *G01N 2223/1016* (2013.01); *G01N 2223/401* (2013.01); *G01N 2223/628* (2013.01)

(58) Field of Classification Search
    CPC ..... G01N 2223/1016; G01N 2223/401; G01N 2223/628; G01V 5/12
    USPC .......................................................... 378/65
    See application file for complete search history.

(56) References Cited

U.S. PATENT DOCUMENTS

| | | | | |
|---|---|---|---|---|
| 2009/0147907 | A1* | 6/2009 | Wraight | G01V 5/125 378/1 |
| 2009/0276158 | A1* | 11/2009 | Kirkwood | G01V 5/101 702/8 |
| 2010/0327174 | A1* | 12/2010 | Edwards | G01N 23/203 250/370.09 |
| 2011/0019801 | A1* | 1/2011 | Eichenseer | G21K 1/025 378/147 |
| 2015/0177409 | A1* | 6/2015 | Sofiienko | G01V 5/08 250/269.1 |
| 2016/0061991 | A1 | 3/2016 | Berkcan et al. | |
| 2016/0187528 | A1* | 6/2016 | Sofiienko | G01N 23/203 250/269.1 |
| 2017/0045640 | A1* | 2/2017 | Zhang | G01V 1/40 |
| 2017/0052280 | A1* | 2/2017 | Zhang | G01V 1/40 |
| 2018/0100816 | A1* | 4/2018 | Featonby | G01N 23/18 |
| 2018/0258756 | A1* | 9/2018 | Nguyen | E21B 47/107 |
| 2019/0004205 | A1* | 1/2019 | Lee | G01V 5/08 |

OTHER PUBLICATIONS

Philip Neil Teague, Imaging of Backscattered Ionizing Radiation—A Key Enabler for Through Mud Borehole Imaging, Offshore Technology Conference, OTC 21667, Presentation in Houston, Texas on May 2-5, 2011, (16 pages).

* cited by examiner

METHODS AND MEANS FOR CASING INTEGRITY EVALUATION USING BACKSCATTERED X-RAY RADIATION IN A WELLBORE ENVIRONMENT

TECHNICAL FIELD

The present invention relates generally to methods and means for monitoring and evaluating casing integrity within wellbore environments.

BACKGROUND

Within the oil & gas industry, it is important to accurately assess the quality and integrity of well casings. The industry currently employs various methods for the verification of the quality of the casing. Typically, calipers or cameras are used to determine whether the casing/tubing is cylindrical and or not-corroded. However, cameras require the wellbore to contain optically clear fluids; otherwise, they are incapable of distinguishing features within the fluid/borehole. More recently, ultra-sonic tools are run within the well in an attempt to image the casing/tubing, or elements outside of the tubing, such as the parts of a downhole safety valve. However, ultrasonic tools are model dependent, so prior knowledge of the precise makeup and status of the well is typically required for the ultrasound data to be compared against.

No viable technologies are currently available including a method or means of employing a combination of collimators, located cylindrically around an X-ray source and located within a non-padded concentrically-located borehole logging tool, together with a single or plurality of rotatable two dimensional per-pixel collimated imaging detector arrays used as primary imaging detectors in order to produce complete, accurate and reliable backscatter images of the casing/tubing.

Prior art teaches a variety of techniques that use x-rays or other radiant energy to inspect or obtain information about the structures within or surrounding the borehole of a water, oil or gas well, yet none teach of a method to use first order detectors (which are typically used to compensate for mudcake/fluid variations) to create a photograph-like image of the casing itself.

U.S. Pat. No. 7,675,029 to Teague et al. teaches an apparatus and method that permits measurement of x-ray backscattered photons from any horizontal surface inside of a borehole using two-dimensional imaging techniques.

U.S. Pat. No. 8,481,919 to Teague teaches a method of producing Compton-spectrum radiation in a borehole without the use of radioactive isotopes, and further discloses rotating collimators around a fixed source installed internally to the apparatus but does not have solid-state detectors with collimators. It further teaches the use of conical and radially symmetrical anode arrangements to permit the production of panoramic x-ray radiation.

U.S. Pat. No. 7,705,294 to Teague teaches a concept for an apparatus that aims to measure backscattered x-rays from the inner layers of a borehole in selected radial directions with the missing segment data being populated through movement of the apparatus through the borehole. The apparatus permits generation of data for a two-dimensional reconstruction of a well or borehole, but arguably fails to teach the geometry necessary for the illuminating x-ray beam to discriminate the depth from which the backscattered photons originated, rather, only their direction.

U.S. Pat. No. 3,564,251 to Youmans discloses the use of a azimuthally scanning collimated x-ray beam to produce an attenuated signal at a detector for the purpose of producing a spiral-formed log of the inside of a casing or borehole surface immediately surrounding the tool, effectively embodied therein as an x-ray caliper. However, the reference fails to teach a method or means for creating a photo-like image, other than a two-dimensional radial plot on an oscilloscope.

U.S. Pat. No. 7,634,059 to Wraight discloses an apparatus used to produce individual two-dimensional x-ray images of the inner surface inside of a borehole using a single pin-hole camera, but without the technical possibility to ascertain the azimuth of the image being taken. Therefore, a tessellation/stitching of multiple images is not disclosed.

US2013/0009049 by Smaardyk discloses an apparatus that allows measurement of backscattered x-rays from the inner layers of a borehole. However, fails to disclose of a means or method to create photo-like two dimensional images of the inner surfaces of the casing, while the tool is being axially moved ('logged') through the wellbore, such that a consolidated two-dimensional image of the well casing can be produced.

U.S. Pat. No. 8,138,471 to Shedlock discloses a scanning-beam based on an x-ray source, a rotatable x-ray beam collimator, and solid-state radiation detectors enabling the imaging of only the inner surfaces of borehole casings and pipelines. However, the reference fails to disclose methods or means of creating photo-like two dimensional images of the inner surfaces of the casing while the tool is being axially moved ('logged') through the wellbore such that a consolidated two-dimensional image of the well casing can be produced.

U.S. Pat. No. 5,326,970 to Bayless discloses a tool that aims to measure backscattered x-rays azimuthally in a single direction in order to measure formation density, with the x-ray source being based on a linear accelerator. However, the reference fails to disclose any methods or means of creating photo-like two dimensional images of the inner surfaces of the casing while the tool is being axially moved ('logged') through the wellbore such that a consolidated two-dimensional image of the well casing can be produced. It also fails to teach a method or means for using a fixed conical/panoramic beam to illuminate the well casing, whereas the directional collimation is located at the rotating detector.

U.S. Pat. No. 5,081,611 to Hornby discloses a method of back projection to determine acoustic physical parameters of an earth formation longitudinally along the borehole using a single ultrasonic transducer and a number of receivers, which are distributed along the primary axis of the tool.

U.S. Pat. No. 6,725,161 to Hillis discloses a method of placing a transmitter in a borehole and a receiver on the surface of the earth, or alternatively a receiver in a borehole and a transmitter on the surface of the earth, in order to discern structural information regarding the geological materials between the transmitter and receiver.

U.S. Pat. No. 6,876,721 to Siddiqui discloses a method to correlate information taken from a core-sample with information from a borehole density log. The core-sample information is derived from a CT scan of the core-sample, whereby the x-ray source and detectors are located on the outside of the sample, and thereby configured as an 'outside-looking-in' arrangement. Various types of information are obtained from the CT scan, such as its bulk density as compared to and correlated with the log information.

U.S. Pat. No. 4,464,569 to Flaum discloses a method to determine the elemental composition of earth formations surrounding a well borehole by processing the detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records backscattered radiation from a formation surrounding the borehole by means of a pulsed electromagnetic energy or photon source, so that characteristic information can be represented in an intensity versus depth plot format.

U.S. Pat. No. 8,664,587 to Evans et al. discloses a method and means for creating azimuthal neutron porosity images in a logging while drilling environment. As bottom hole assembly based systems historically relied upon the rotation of the drill string to assist in the acquisition of azimuthally dependent data, the patent discusses an arrangement of azimuthally static detectors which could be implemented in a modern BHA which does not necessarily rotate with the bit, by subdividing the neutron detectors into a plurality of azimuthally arranged detectors which are shielded within a moderator to infer directionality to incident neutrons and gamma.

U.S. Pat. No. 9,012,836 to Wilson et al. discloses a method and means for creating azimuthal neutron porosity images in a wireline environment. Similar to U.S. Pat. No. 8,664,587, the reference discusses an arrangement of azimuthally static detectors which could be implemented in a wireline tool in order to assist an operator when interpreting logs post-fracking by subdividing the neutron detectors into a plurality of azimuthally arranged detectors which are shielded within a moderator to infer directionality to incident neutrons and gamma.

U.S. Pat. No. 4,883,956 to Manente et al. discloses an apparatus and methods for investigation of subsurface earth formations, using an apparatus adapted for movement through a borehole. Depending upon the formation characteristic or characteristics to be measured, the apparatus may include a natural or artificial radiation source for irradiating the formations with penetrating radiation such as gamma rays, x-rays or neutrons. The light produced by a scintillator in response to detected radiation is used to generate a signal representative of at least one characteristic of the radiation and this signal is recorded.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rugosity and/or lithology.

SUMMARY

An x-ray-based casing imaging tool having a combination of source collimators located cylindrically around an x-ray source and a rotatable two-dimensional per-pixel collimated imaging detector array is provided, the tool including at least: an x-ray source; a radiation shield to define the output form of produced x-rays; a direction controllable two-dimensional per-pixel collimated imaging detector array; an imaging window within the tool housing that reduces the attenuation of x-rays passing through said tool housing; sonde-dependent electronics; and a plurality of tool logic electronics and PSUs.

A method of using an x-ray-based casing imaging tool to monitor and determine the integrity of well casing or tubing is also provided, the method including at least the steps of: producing x-rays in a shaped output; measuring the intensity of backscatter x-rays returning from the casing or tubing; controlling two-dimensional per-pixel collimated imaging detector arrays; and converting image data from said detectors into consolidated images of the wellbore materials.

BRIEF DESCRIPTION OF SEVERAL EXAMPLE EMBODIMENTS

The methods and means described herein for casing integrity evaluation through x-ray backscatter imaging in a cased wellbore environment is disclosed in an example embodiment as a package that does not require direct physical contact with the well casings (i.e., non-padded). The methods and means herein further comprise the use of a combination of collimators, typically located cylindrically around an X-ray source and located within a non-padded, concentrically-located borehole logging tool, together with a single or plurality of rotatable two dimensional per-pixel collimated imaging detector array(s) also used as the primary imaging detector(s). The capability to control the viewing direction of the collimated detectors permits an operator to either log the tool through the well casing while the detectors rotated azimuthally in order to produce a two dimension helical ribbon backscatter x-ray image, or to hold the tool stationary as the collimated detector rotates azimuthally and captures a cylindrical image that can be improved upon 'statically' (as the detector continues to recapture casing images that can be added to the existing image set), and/or to actuate the detector such that a closer inspection of a particular region may be performed by pan-tilt control of the collimated detector.

In one example embodiment, an x-ray-based casing imaging tool [101] is deployed by wireline conveyance [103, 104] into a cased borehole [102], wherein the well casing or tubing [102] is imaged. The tool is enclosed by a pressure housing which ensures that well fluids are maintained outside of the housing.

Figure 1:
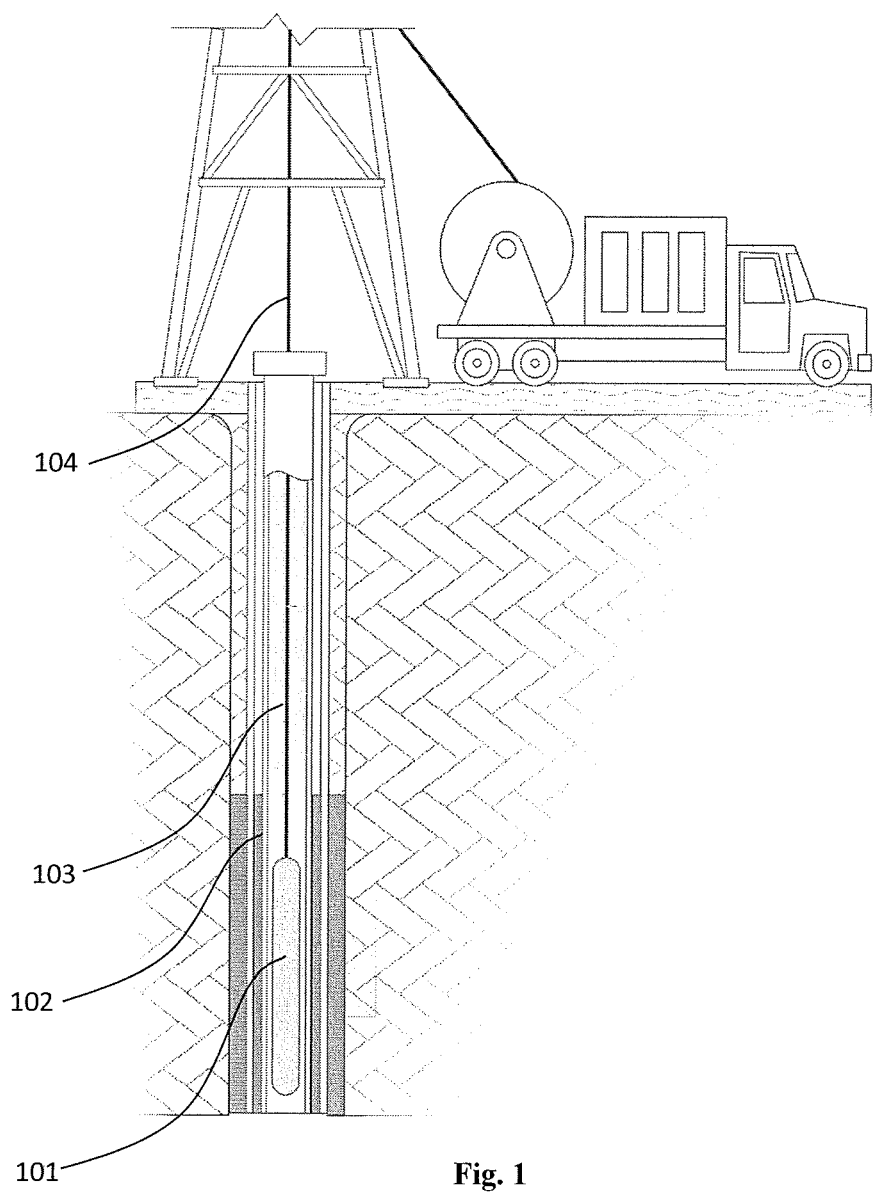
FIG. 1 illustrates an x-ray-based casing imaging tool being deployed into a borehole via wireline conveyance. Regions of interest within the materials surrounding the borehole are also indicated.
Figure 2:
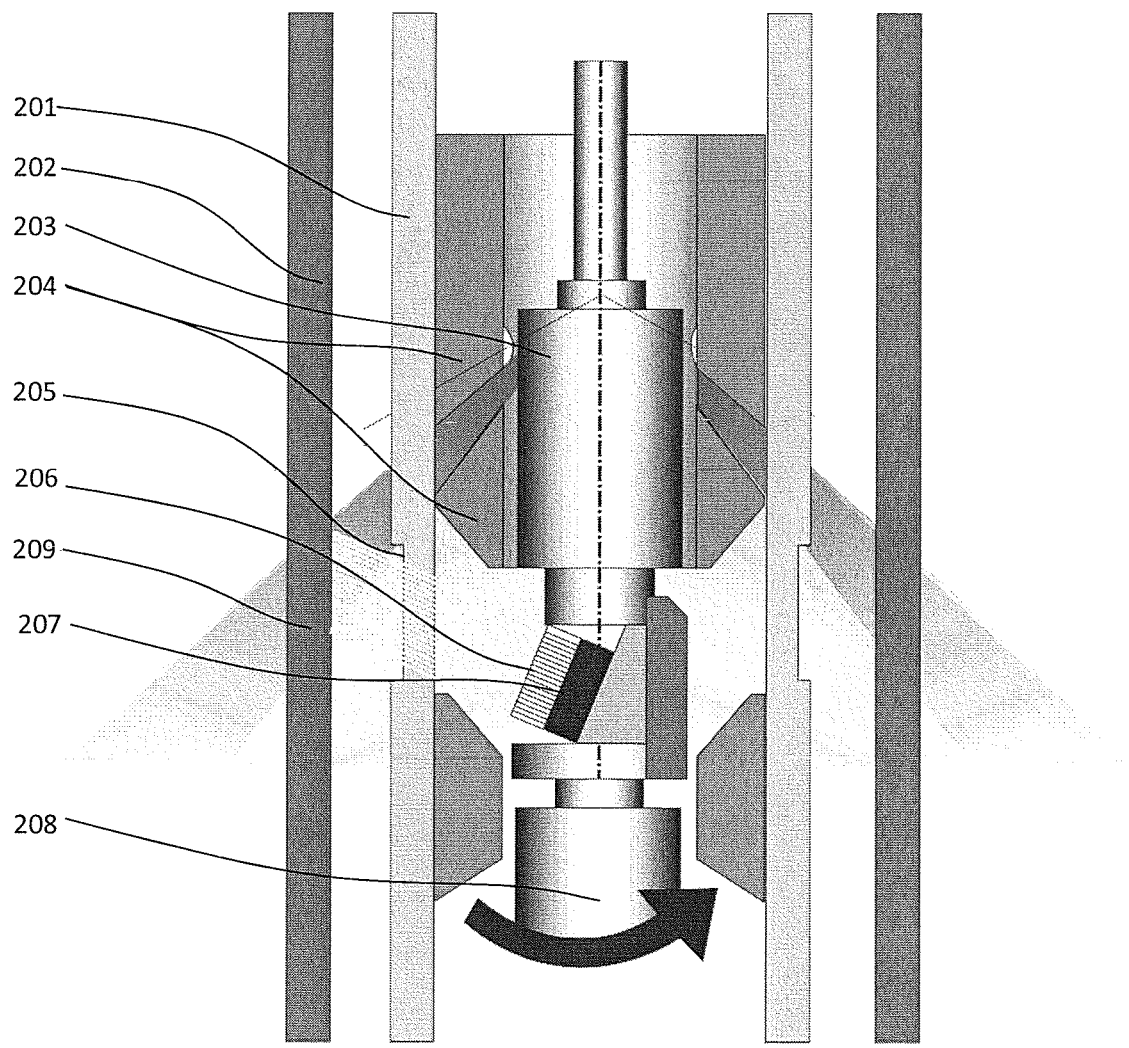
FIG. 2 illustrates one example of an x-ray-based casing imaging tool, arranged such as to enable imaging of the inner-most casing or tubing.

FIG. 2 illustrates an example pressure housing [201] that is conveyed through a well casing or tubing [202]. The pressure housing contains an electronic x-ray source [203] that is configured to produce x-rays panoramically in a conical output, the shape and distribution of said x-ray output is determined by the geometry of the collimator [204] which is formed by creating a non-blocking region of the radiation shielding. The conical x-ray beam illuminates a cylindrical section of the casing/tubing [209]. The radiation scattering from the casing is imaged by a two-dimensional detector array [207], which is attached to a per-pixel array collimator [206]. The detector collimator [206] reduces the field of view of each pixel of the detector array [207] such that each pixel images a distinct and unique section of the illuminated casing/tubing [209]. A thinned section of the tool housing [205] reduces the amount of attenuation of the scattered photons by the tool housing [201], resulting in improved statistics reaching the detector assembly [206, 207]. A motor/servo [208] is used to rotate the detector azimuthally, such that the collimated detector array images the illuminated ring section of the casing/tubing [209]. While the motor/servo [208] rotates the collimated detector arrays [206, 207], back-scatter images are acquired by the detector of both the casing/tubing. As the tool is being conveyed through the wellbore, the result would be a helical ribbon of stacked images of the casing or tubing [202].

In another example embodiment, as the detector assembly rotates azimuthally, each axial 'column' of pixels of the detector arrays is sampled such that each column images a similar section of the casing/tubing that has already been imaged by its neighbor prior during the last sample. Upon encoding the images with the known azimuthal capture position of the image section, the separate image pixel columns associated with each imaged 'slit' section of the casing/tubing are then summated/averaged to produce a higher quality image within a single pass.

In another example embodiment, two detectors are used back-to-back facing outwards, or side-by-side facing opposite directions, for each detector set, such that when the detector assembly is rotated, a double-helical image ribbon is produced as the tool is conveyed through the wellbore.

In yet another example embodiment, 'n' number of detectors are used facing outwards, or arranged for maximal volumetric packing efficiency, for each detector assembly position, such that when the detector assembly is rotated, n-helical image ribbons are produced for each radial depth being images as the tool is conveyed through the wellbore.

In another example embodiment, the logging speed and detector assembly rotational rate are matched such that a single azimuthal rotation of the detector assembly is performed while the tool is conveyed axially by one imaged axial tubing/casing section height, such that the resulting images of the casing/tubing are helically welded.

In another example embodiment, the detector assemblies' rotation and axial/radial tilt are controlled through the use of servos/actuators such that the operator can stop the tool within the borehole and inspect certain sections of the casing/tubing (i.e., without the detector assembly being in continual rotation mode).

In a further embodiment still, the operator stops the conveyance of the tool and uses the azimuthal rotation of the detector assembly to continually sample the same images tubing/casing illuminated cylinder [9] section such that the resulting data set builds/summates statistically so as to improve image quality.

In another example embodiment, the backscatter images also contain spectral information, such that a photo-electric or characteristic-energy measurement are taken, and such that the imaged material can then be analyzed for scale-build up or casing corrosion etc.

In a further embodiment still, machine learning is employed to automatically analyze the spectral (photo electric or characteristic energy) content of the images to identify key features, such as corrosion, holes, cracks, scratches, and/or scale-buildup.

In a further example embodiment, the per-pixel collimated imaging detector array comprises a single 'strip' array i.e. one pixel wide azimuthally, and multiple pixels long axially—the imaging result would be a 'cylindrical' ribbon image. The tool could be moved axially (either by wireline-winch or with a stroker) and a new image set taken such that a section of casing could be imaged by stacking cylindrical ribbon images/logs.

In a further embodiment still, machine learning is employed to automatically reformat (or re-tesselate) the resulting images as a function of depth and varying logging speeds or logging steps such that the finalized casing and/or cement image is accurately correlated for azimuthal direction and axial depth, by comparing with CCL, wireline run-in measurements, and/or other pressure/depth data.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray-based casing imaging tool having a combination of source collimators located cylindrically around an x-ray source and a rotatable two-dimensional per-pixel collimated imaging detector array, said tool comprising:
   an x-ray source;
   a cylindrical radiation shield to define the output form of produced x-rays to a panoramically conic output;
   a direction controllable two-dimensional per-pixel collimated imaging detector array;
   an imaging window within the tool housing that reduces the attenuation of x-rays passing through said tool housing;
   Sonde-dependent electronics; and
   a plurality of tool logic electronics and PSUs.

2. The tool of claim 1, wherein said imaging detector further comprises a two-dimensional per-pixel collimated imaging detector arrays, and wherein the imaging array is one pixel wide and multiple pixels long.

3. The tool of claim 1, wherein said imaging detector further comprises two sets of two-dimensional per-pixel collimated imaging detector arrays.

4. The tool of claim 1, wherein said imaging detector comprises a plurality of two-dimensional per-pixel collimated imaging detector arrays.

5. The tool of claim 1, wherein a rotation rate of the imaging detectors is matched to an axial logging speed of said tool in order to create a continuous helical image ribbon without blind regions.

6. The tool of claim 1, wherein the imaging detectors rotate continuously while said tool is stationary within the wellbore in order to produce statistically accumulated cylindrical images over the same region of the wellbore.

7. The tool of claim 1, wherein the images further comprise spectral information to used inform the characteristics of any wellbore materials or debris.

8. The tool of claim 1, wherein said shield further comprises tungsten.

9. The tool of claim 1, wherein the tool is combinable with other measurement tools comprising one or more of acoustic and ultrasonic.

10. The tool of claim 1, wherein the tool is used to determine the integrity of the casing or tubing immediately surrounding the wellbore.

11. The tool of claim 1, wherein machine learning is used to reformat or re-tesselate the resulting images as a function of depth and varying logging speeds or logging steps.

12. The tool in claim 7, wherein machine learning is employed to use the spectral information contained within a plurality of image data in order to determine the type of material being imaged from its spectral characteristics.

* * * * *